(12) United States Patent
Fitch et al.

(10) Patent No.: US 8,306,880 B1
(45) Date of Patent: Nov. 6, 2012

(54) SYSTEM AND METHOD FOR DETERMINING FOREIGN PAID TAXES

(75) Inventors: Todd Matthew Fitch, Santa Clara, CA (US); Thomas A. Frasher, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 730 days.

(21) Appl. No.: 11/833,923

(22) Filed: Aug. 3, 2007

(51) Int. Cl.
*G06F 17/22* (2006.01)

(52) U.S. Cl. .............................. 705/31; 705/16; 705/19

(58) Field of Classification Search .................... 705/16, 705/31, 71, 19; 715/234
See application file for complete search history.

(56) References Cited

U.S. PATENT DOCUMENTS

| | | | | |
|---|---|---|---|---|
| 5,903,876 A | * | 5/1999 | Hagemier | 705/19 |
| 6,003,016 A | * | 12/1999 | Hagemier | 705/19 |
| 6,202,052 B1 | * | 3/2001 | Miller | 705/31 |
| 6,546,373 B1 | * | 4/2003 | Cerra | 705/19 |
| 6,697,787 B1 | * | 2/2004 | Miller | 705/31 |
| 6,845,364 B1 | * | 1/2005 | Pool et al. | 705/26.35 |
| 7,234,103 B1 | * | 6/2007 | Regan | 715/234 |
| 2001/0037250 A1 | * | 11/2001 | Lefkowitz | 705/26 |
| 2001/0037268 A1 | * | 11/2001 | Miller | 705/31 |
| 2003/0160096 A1 | * | 8/2003 | Morimoto | 235/375 |
| 2004/0181470 A1 | * | 9/2004 | Grounds | 705/31 |
| 2005/0096989 A1 | * | 5/2005 | Ostlund | 705/19 |
| 2005/0261967 A1 | * | 11/2005 | Barry et al. | 705/16 |
| 2005/0261995 A1 | * | 11/2005 | Phelan | 705/31 |
| 2006/0095350 A1 | * | 5/2006 | Hall et al. | 705/30 |
| 2006/0235776 A1 | * | 10/2006 | Temme | 705/31 |
| 2006/0282354 A1 | * | 12/2006 | Varghese | 705/32 |
| 2008/0091614 A1 | * | 4/2008 | Bas Bayod et al. | 705/71 |

\* cited by examiner

*Primary Examiner* — Scott Zare
*Assistant Examiner* — Talia Crawley
(74) *Attorney, Agent, or Firm* — Osha Liang LLP

(57) ABSTRACT

A method for determining foreign paid taxes involves receiving an identification (ID) value linked to an account; requesting a financial record associated with a foreign tax jurisdiction from the account; obtaining a total price of a purchase associated with the financial record; extracting a foreign paid tax from the total price; calculating a tax sum based on the foreign paid tax; and populating a section of a form based on the tax sum.

33 Claims, 6 Drawing Sheets

SYSTEM AND METHOD FOR DETERMINING FOREIGN PAID TAXES

BACKGROUND

Organizations of all types (e.g., corporations, non-profit groups, academic institutions, households, individuals, trusts, estates, and/or other entities) and individuals associated with these organizations are typically required to complete financial forms. In some cases, these financial forms are completed on an infrequent basis (e.g., once during the life of the organization). In other cases, these financial forms are completed on a frequent basis (e.g., annually, semi-annually, quarterly, and/or other periods of time).

Financial forms are often used to report financial events to a financial body (e.g., a tax authority). Financial forms may be any number of pages long and may be divided into multiple sections, with each section pertaining to one or more financial events. In many cases, financial forms may also be used to determine additional payments and/or credits that result from the reported financial events (e.g., tax bill, tax refund, etc.).

The payment of a tax is an example of a financial event that may be reported by one or more financial forms. A tax is a fee charged (i.e., levied) by a governing body (e.g., municipal government, state government, federal government, etc.) on a product, income, or activity to finance expenditures. Many different types of taxes exist, including sales taxes, luxury taxes, income taxes, alcohol taxes, etc. When a tax is levied directly on personal or corporate income, said tax is referred to as a direct tax. When a tax is levied on the price of a product or service, said tax is referred to as a indirect tax.

SUMMARY

In general, in one aspect, the invention relates to a method for determining foreign paid taxes. The method includes receiving an identification (ID) value linked to an account; requesting a financial record associated with a foreign tax jurisdiction from the account; obtaining a total price of a purchase associated with the financial record; extracting a foreign paid tax from the total price; calculating a tax sum based on the foreign paid tax; and populating a section of a form based on the tax sum.

In general, in one aspect, the invention relates to a method for determining foreign paid taxes. The method includes linking an identification (ID) value to a profile; linking an account to the profile; receiving a trigger to initiate aggregation a plurality of foreign paid taxes recorded in the account and associated with a foreign tax jurisdiction; and populating a section of a form using a tax sum calculated from aggregation of the plurality of foreign paid taxes.

In general, in one aspect, the invention relates to a computer readable medium storing instructions for determining foreign paid taxes. The instructions include functionality to receive an identification (ID) value linked to an account; request a financial record associated with a foreign tax jurisdiction from the account; obtain a total price of a purchase associated with the financial record; extract a foreign paid tax from the total price; calculate a tax sum based on the foreign paid tax; and populate a section of a form based on the tax sum.

In general, in one aspect, the invention relates to a computer readable medium storing instruction for determining foreign paid taxes. The instructions including functionality to link an identification (ID) value to a profile; link an account to the profile; receive a trigger to initiate aggregation a plurality of foreign paid taxes recorded in the account and associated with a foreign tax jurisdiction; and populate a section of a form using a tax sum calculated from aggregation of the plurality of foreign paid taxes.

In general, in one aspect, the invention relates to a system for determining foreign paid taxes. The system includes an account access module configured to request a financial record associated with a foreign tax jurisdiction from an account, where the account is identified based on an identification (ID) value; a tax module operatively connected to the account access module and configured to extract a foreign paid tax from the financial record; and a form generator operatively connected to the tax module and configured to populate a section of a form using a tax sum calculated from the foreign paid tax.

Other aspects of the invention will be apparent from the following description and the appended claims.

DETAILED DESCRIPTION

Figure 1:
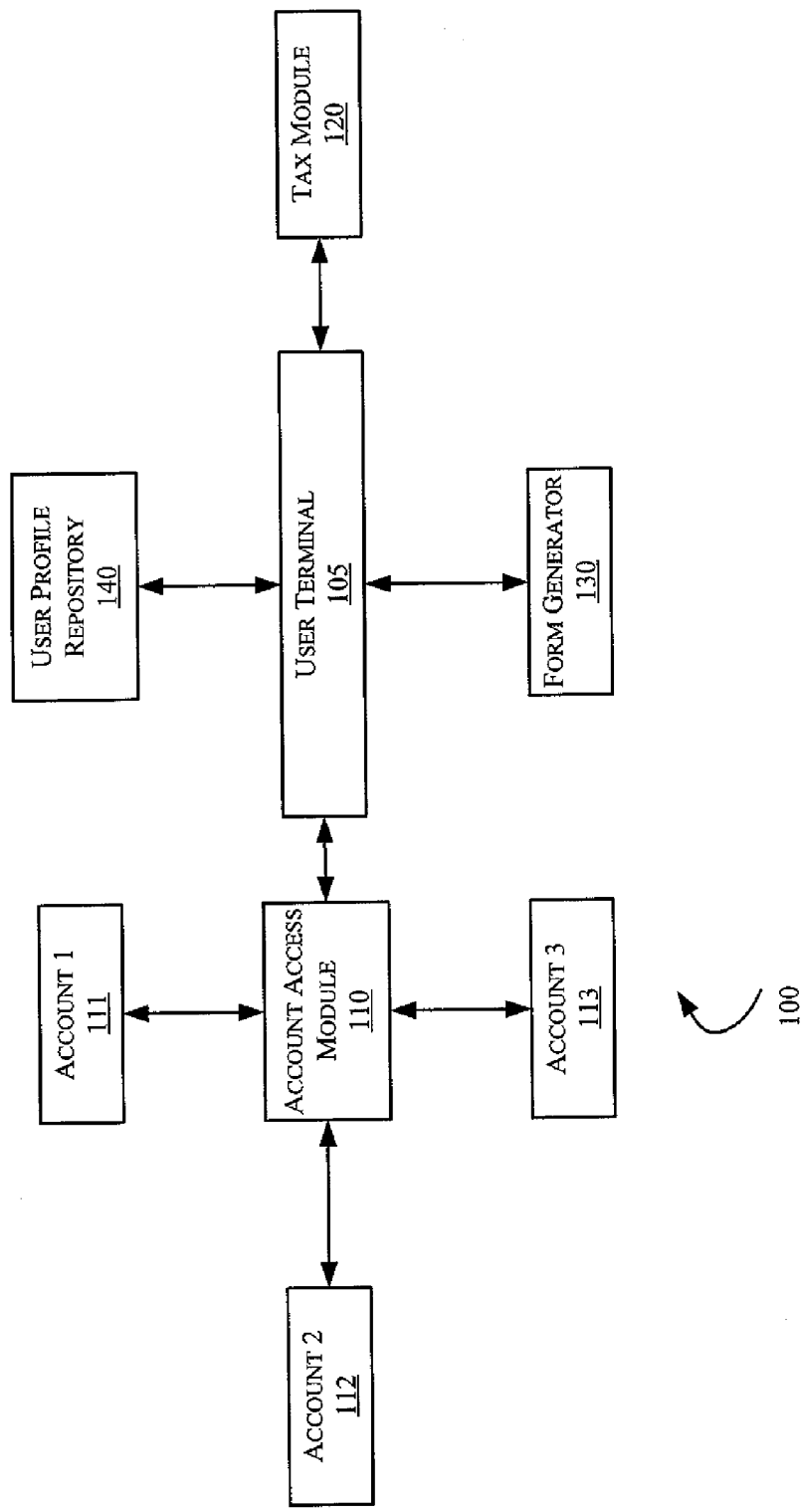
FIG. 1 shows a financial management system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for determining foreign paid taxes based on the foreign tax jurisdiction and tax rate of a purchased good and/or service. In general, embodiments of the invention provide a system and method for determining foreign paid taxes using a user profile and accounts linked to the user profile. In general, embodiments of the invention provide a system and method for determining foreign paid taxes and using this information regarding paid taxes to populate a section of a financial form.

When visiting a foreign country, a traveler must often pay taxes levied on goods and/or services purchased in the foreign country. As the traveler is not a resident of the foreign country, the paid taxes may be referred to as foreign paid taxes. However, upon departure from the foreign country, the traveler may be entitled to a refund of at least a portion of the foreign paid taxes. The refund may be obtained from a tax authority in the foreign country. For example, the Internal Revenue Service (IRS) is a tax authority in the United States of America (US). When a foreigner is visiting the US, the foreigner must pay the levied tax on any good and/or service purchased in the US. However, upon departure from the US, the foreigner may be entitled to at least a partial refund of these foreign paid taxes from the IRS. This partial refund may be obtained by populating at least a section of a visitor tax rebate form.

In one or more embodiments of the invention, the total price of the purchase includes the price of the purchased good or service plus a tax levied, if any, on the purchased good or service. The total price of the purchase, by itself, may not reveal the individual values of the price of the purchase and the levied tax. However, it may be possible to extract the levied tax and/or the price of the purchase from the total price using additional information (discussed below). The levied tax may be, for example, a sales tax, an import tax, an alcohol tax, a tobacco tax, a gas tax, a goods and services fax (GST), a value added tax (VAT), a luxury tax, a consumption tax, a state tax, a federal tax, or any combination of taxes. The levied tax may be (i) a percentage of the price of the purchase referred to as a tax rate (e.g., 8.25%) and/or (ii) a fixed tax amount independent of the price of the purchase (e.g., $25.10).

In one or more embodiments of the invention, a tax jurisdiction defines a geographical area that has a distinct set of tax rules and regulations. The tax rate or fixed tax amount applied to a given good or service may be constant throughout the tax jurisdiction. In other words, regardless of where the good or service is purchased within the tax jurisdiction, the tax rate and/or fixed tax amount is the same. A tax jurisdiction may be of any size including one or more zip codes, a city, a municipality, a county, a parish, a borough, a state, a country, or even multiple countries (e.g., the European Union (EU), North America).

In one or more embodiments of the invention, a tax jurisdiction associated with a foreign country is referred to as a foreign tax jurisdiction. For example, New York City is a foreign tax jurisdiction for a foreigner visiting the US. Similarly, the state of California is a foreign tax jurisdiction for a foreigner visiting the US. In fact, every location in the US is a foreign tax jurisdiction for a foreigner visiting the US.

In one or more embodiments of the invention, the taxable status of a purchase indicates whether the purchased good or service is taxable (i.e., whether at least one tax is levied on the purchase) and/or the type of tax, if any, levied on the purchase. Those skilled in the art, having the benefit of this detailed description, will appreciate the taxable status of a purchased good or service is completely dependent on the tax jurisdiction. In other words, two different tax jurisdictions may levy different types and/or amounts of taxes on the identical purchase. For example, clothing may be taxed in one tax jurisdiction, but not taxed in a neighboring tax jurisdiction.

In one or more embodiments of the invention, a financial record is associated with one or more purchased goods and/or services. The financial record may store (i) the total price of each purchased good or service, (ii) the tax jurisdiction where each good or service was purchased, and/or (iii) the taxable status of each purchased good or service. In one or more embodiments of the invention, the financial record stores the date when each good or service was purchased (i.e., purchase date).

FIG. 1 shows a financial management system (100) in accordance with one or more embodiments of the invention. As shown in FIG. 1, the financial management system (100) has multiple components including one or more accounts (i.e., Account 1 (111), Account 2 (112), Account 3 (113)), an account access module (110), a user terminal (105), a user profile repository (140), a tax module (120), and a form generator (130). Each of these components are described below and may be located on the same device (e.g., a server, mainframe, desktop personal computer, laptop, personal digital assistant, television, cable box, satellite box, kiosk, telephone, mobile phone, etc.) or may be located on separate devices connected by a network (e.g., the Internet), with wired and/or wireless segments.

In one or more embodiments of the invention, each of the accounts (i.e., Account 1 (111), Account 2 (112), Account 3 (113)) is a collection of financial records. The accounts (i.e., Account 1 (111), Account 2 (112), Account 3 (113)) and the collection of financial records in the accounts (i.e., Account 1 (111), Account 2 (112), Account 3 (113)) may be associated with one or more users. Further, one or more of the accounts (i.e., Account 1 (111), Account 2 (112), Account 3 (113)) may be managed by a financial institution. For example, a credit card account is one type of account. Transactions involving the credit card account are examples of financial records. In addition, the credit card account may be held individually or jointly and managed by a credit card company. Those skilled in the art, having the benefit of this detailed description, will appreciate there exists many different types of accounts (e.g., debit accounts, brokerage accounts, bank accounts, credit union accounts, etc.).

In one or more embodiments of the invention, an account is associated with a home tax jurisdiction. The home tax jurisdiction may be the tax jurisdiction where the account was opened and/or where the owner of the account lives or declares his/her residency. In one or more embodiments of the invention, any tax jurisdiction outside of the home tax jurisdiction may be considered a foreign tax jurisdiction.

In one or more embodiments of the invention, new financial records may be added to the accounts (i.e., Account 1 (111), Account 2 (112), Account 3 (113)) while existing financial records may modified and/or deleted. The accounts (i.e., Account 1 (111), Account 2 (112), Account 3 (113)) may be implemented using repositories, databases, an extensible markup language (XML), and/or flat files. In one or more embodiments of the invention, one or more accounts (i.e., Account 1 (111), Account 2 (112), Account 3 (113)) may be stored on a mobile phone used to make purchases. In addition, each account (i.e., Account 1 (111), Account 2 (112), Account 3 (113)) may have a different architecture and/or different commands to access financial records in the account. Authentication requirements (e.g., passwords, personal identification numbers, biometrics, etc.) may need to be satisfied prior to accessing the accounts (i.e., Account 1 (111), Account 2 (112), Account 3 (113)).

In one or more embodiments of the invention, the account access module (110) is configured to forward requests for financial records to one or more of the accounts (i.e., Account 1 (111), Account 2 (112), Account 3 (113)). Similarly, the account access module (110) may be configured to transfer received financial records to the requesting party. In one or more embodiments of the invention, the account access module (110) is configured to translate requests for financial records and the received financial records between formats in order to successfully communicate with the architectures of the accounts (i.e., Account 1 (111), Account 2 (112), Account 3 (113)) and the requesting party.

In one or more embodiments of the invention, the user profile repository (140) stores one or more user profiles. Each user profile may contain personal information associated with the user (e.g., user name, user address, etc.), in addition to information identifying one or more accounts owned/held by the user (e.g., account numbers, transit numbers, routing numbers, managing financial institutions, etc.). In other words, one or more accounts may be linked to a user profile. In one or more embodiments of the invention, a user profile includes dates the user will be in a foreign tax jurisdiction (e.g., a foreign country). These dates form a time interval during which the user is in a foreign tax jurisdiction.

In one or more embodiments of the invention, each user profile is identified by an identification (ID) value (e.g., a passport number, a social security number, etc.). Accordingly, the user profile effectively links the ID value to one or more of the accounts.

In one or more embodiments of the invention, the tax module (120) is configured to (i) identify the tax jurisdiction of a purchase based on the corresponding financial record, (ii) determine the taxable status of the purchase, and (iii) calculate the tax paid on a purchased good or service based on (i) and (ii).

In one or more embodiments of the invention, the tax module (120) includes one or more look-up tables mapping a tax jurisdiction to a tax rate and/or fixed tax amount. The tax module (120) may have one or more look-up tables for each tax jurisdiction and one or more look-up tables for purchases of different taxable status (i.e., items with different types/amounts of levied taxes). The one or more look-up tables may be stored within the tax module (120) and/or the one or more look-up tables may be associated with a website accessible by the tax module (120). New look-up tables and/or updates to existing tax tables may be obtained from a website, accessible to the tax module (120).

In one or more embodiments of the invention, the form generator (130) is configured to populate forms (e.g., a visitor tax rebate form) and/or form sections using the calculated paid tax. The forms may be stored in the form generator (130) or may be stored at a remote site (e.g., a website) (not shown) accessible to the form generator (130). The form generator (130) may also be configured to print the forms and/or transmit them electronically in any format to a third-party and/or the user.

In one or more embodiments of the invention, the user terminal (105) provides an interface to the form generator (130), the tax module (120), the user profile repository (140), and the account access module (110). The user terminal (105) may be configured, using a graphical user interface (GUI) for example, to accept input (e.g., keyboard input, touch-screen input, cursor input, voice commands, etc.) from the user and produce outputs (e.g., on a display screen, printer, audio speakers, etc.). Similarly, a textual-based system may be used in lieu of a GUI. The user terminal (105) may be a kiosk accessible by a user.

In one or more embodiments of the invention, the user terminal (105) includes a scanner (not shown) to read cards (e.g., credit cards, debit cards, etc.) and passports. Information obtained from the scanner may be used to populate a user profile and/or provide an ID value as part of search criteria (discussed below).

Figure 2:
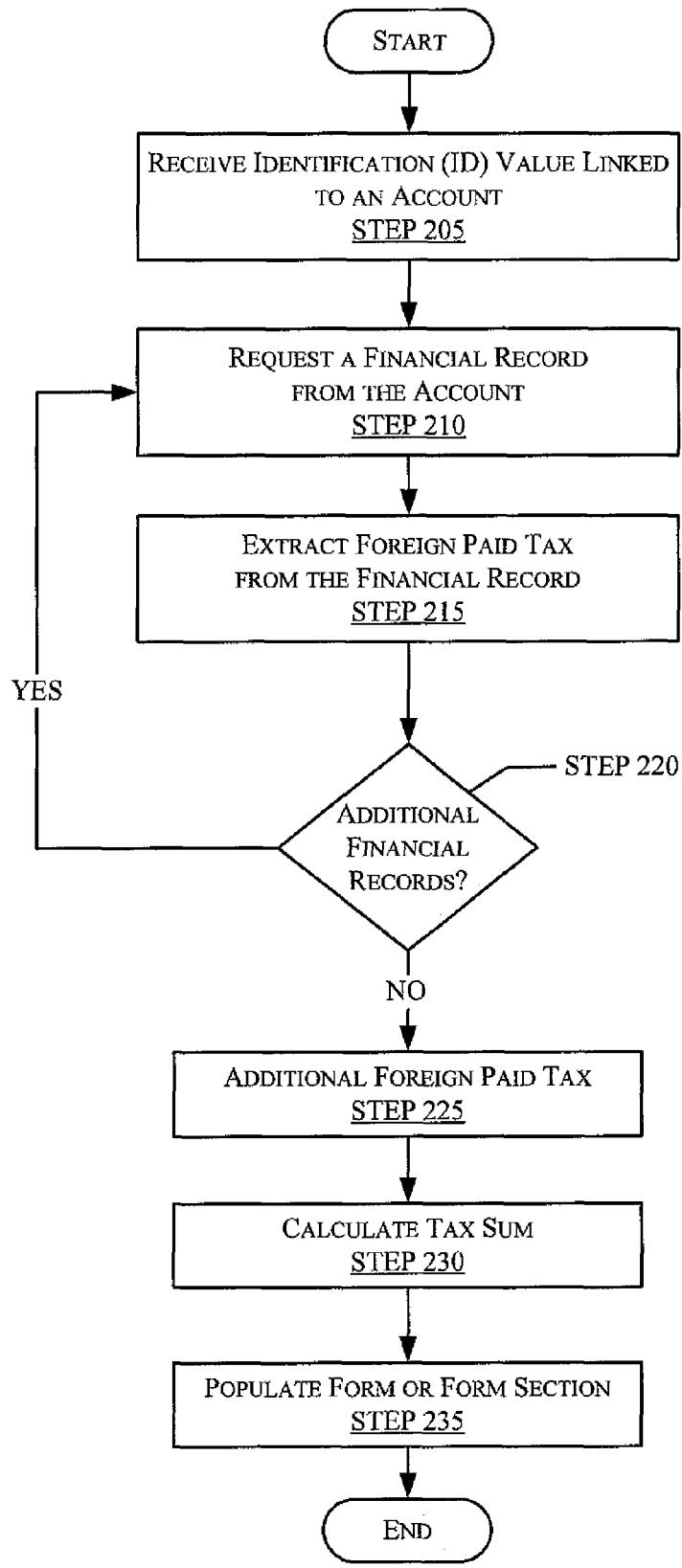
FIG. 2 and FIG. 3 show flowcharts in accordance with one or more embodiments of the invention.

FIG. 2 shows a flowchart in accordance with one or more embodiments of the invention. The steps of the flowchart shown in FIG. 2 may be used to determine foreign paid tax on one or more purchases, and for use in populating a financial form or form section. Those skilled in the art, having the benefit of this detailed description, will appreciate the order and number of steps shown in FIG. 2 may differ among embodiments of the invention.

Initially, an ID value (e.g., a passport number, a credit card number, a social security card number, etc.) is received (STEP 205). In one or more embodiments of the invention, the ID value is entered directly by the user (e.g., via the keyboard) or provided through a scanner. As discussed above, an ID value and an account may be linked through a user profile. Accordingly, the received ID value may effectively identify an account. In other words, for example, a received passport number may identify a credit card account if both the passport number and credit card account are linked to the same user profile. Those skilled in the art, having the benefit of this detailed description, will appreciate that in some scenarios, a user profile is not needed to identify an account from the received ID value because the relationship is explicit (e.g., a received credit card number and the corresponding credit card account).

In STEP 210, a request is issued for a financial record associated with the identified account. In one or more embodiments of the invention, the issued request includes a criterion that any financial record retrieved in response to the request is associated with a foreign tax jurisdiction. Similarly, the issued request may include a criterion that any financial record retrieved in response to the request is associated with a purchase date satisfying a time interval set forth in the user profile associated with the received ID value and/or provided by the user.

In STEP 215, the foreign paid tax is extracted from the retrieved financial record. As discussed above, a financial record includes (i) a total price of a purchased good or service, (ii) the tax jurisdiction where the good or service was purchased, and/or (iii) the taxable status of the purchased good or service. The tax rate and/or fixed tax levied on the purchase associated with the retrieved financial record may be determined from look-up tables. Then, the foreign tax levied on the purchase may calculated by the following:

$$\text{TAX} = \left[\frac{TP - FTA}{1 + TR}\right] \times TR + FTA \quad (1)$$

where TAX is the foreign tax levied on the purchase, TP is the total price of the purchase, TR is the tax rate, if any, and FTA is the fixed tax amount, if any. Those skilled in the art, having the benefit of this detailed description, will appreciate that $TR \geq 0$ and $FTA \geq 0$.

In STEP 220, it is determined whether additional records exist in the identified account satisfying the request criteria of STEP 210. When it is determined no further records exist in the account satisfying the request criteria of STEP 210, the process proceeds to STEP 225. When it is determined at least one financial record exists in the identified account satisfying the request criteria of STEP 210, the process returns to STEP 210.

In STEP 225, an additional foreign paid tax may be received. This foreign paid tax may be manually entered by the user (e.g., via a keyboard, touch-screen, etc.) or through a scanner. This manually entered foreign paid tax is associated with a purchase for which no financial record exists (e.g., cash purchase, out of date accounts, etc.). Those skilled in the art, having the benefit of this detailed description will appreciate that STEP 225 is optional and may be omitted.

In STEP 230, a tax sum is calculated. In one or more embodiments of the invention, a tax sum is the summation of the extracted foreign paid taxes resulting from one or more iterations of STEP 215. When there is a total of N retrieved financial records (i.e., $N \geq 1$), and thus N iterations of STEP 215, the tax sum may be calculated as follows:

$$\text{TAX SUM} = \sum_{k=1}^{N} \left[\frac{TP_k - FTA_k}{1 + TR_k}\right] \times TR_k + \sum_{k=1}^{N} FTA_k \quad (2)$$

where $TP_k$ is the total purchase price of the $k^{th}$ purchase, $TR_k$ is the tax rate of the $k^{th}$ purchase, and $FTA_k$ is the fixed tax amount of the $k^{th}$ purchase. Those skilled in the art, having the benefit of this detailed description, will appreciate that $TR_k \geq 0$ and $FTA_k \geq 0$.

In STEP 235, the calculated tax sum (STEP 230) is used to populate a financial form or form section (e.g., a visitor tax rebate form). The resulting populated form or form section may be stored, printed, and/or electronically transmitted to a third party (e.g., a tax authority) in any format.

In one or more embodiments of the invention, after transmitting the populated financial form or form section to the third party, the user receives a confirmation (e.g., via an email, a voicemail, a text message, etc.) from the third party that the transmission was successful. In one or more embodiments of the invention, any rebate from the third party following submission of the populated form or form section may be (i) directly deposited to one or more accounts specified by the user, (ii) applied as credit to one or more credit card accounts specified by the user, (iii) mailed as one or more checks to addresses specified by the user, or (iv) any combination of (i), (ii), and (iii).

Although the process shown in FIG. 2 has only been discussed in regard to a single identified account, those skilled in the art, having the benefit of this detailed description, will appreciate that STEPS 210, 215, and 220 may be repeated for any number of identified accounts.

Figure 3:
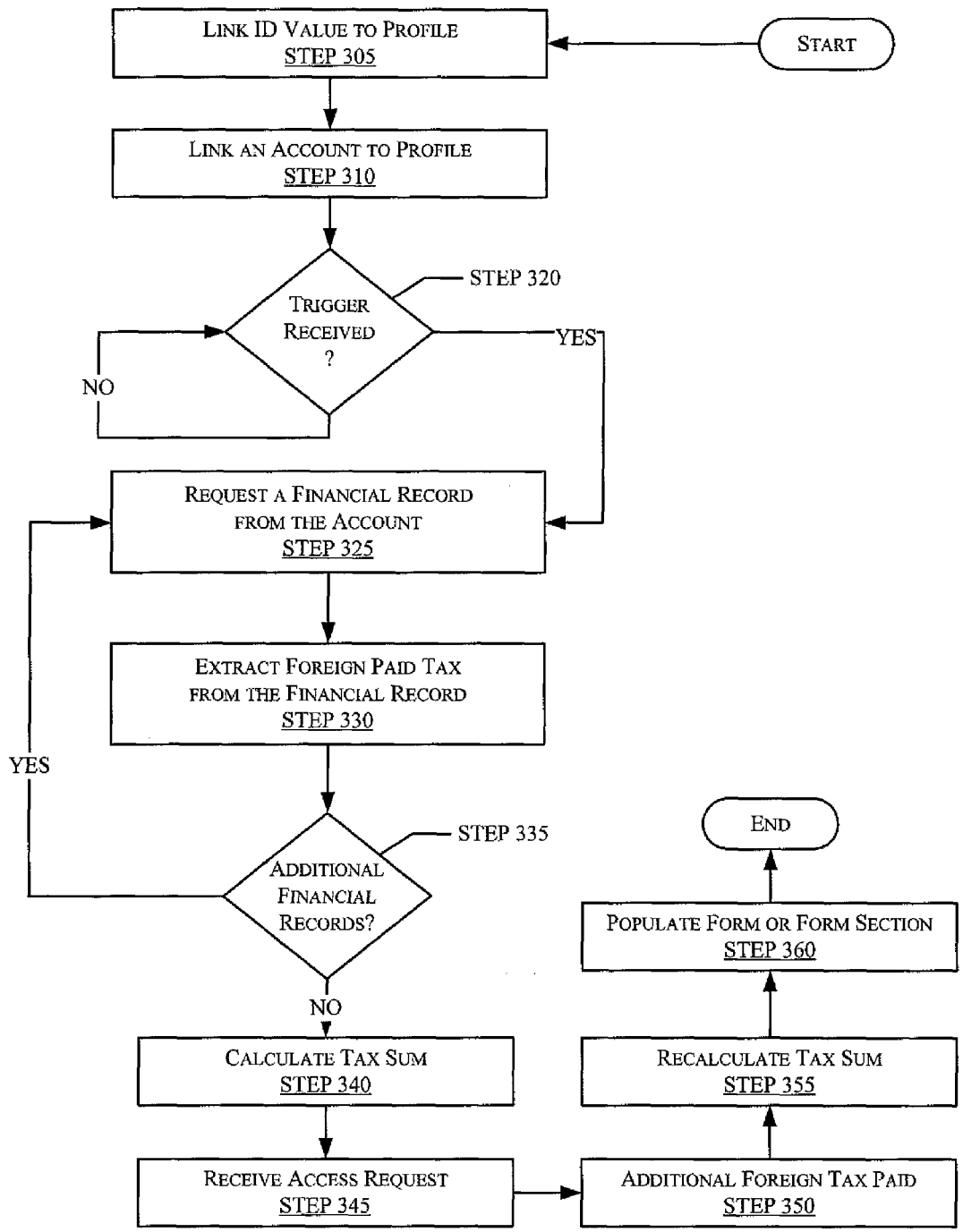

FIG. 3 shows a flowchart in accordance with one or more embodiments of the invention. The steps of the flowchart shown in FIG. 3 may be used to determine foreign paid tax on one or more purchases, and for use in populating a financial form or form section. Those skilled in the art, having the benefit of this detailed description, will appreciate the order and number of steps shown in FIG. 3 may differ among embodiments of the invention.

Initially, an ID value (e.g., a passport number, a credit card number, a social security number, a bank account number, etc.) is linked to a user profile. The user may manually input the ID value (i.e., via a keyboard, a touch-screen, etc.) or the user may provide the ID value through a scanner.

In STEP 310, an account is linked to the user profile. Account information (e.g., account numbers, transit numbers, managing financial institutions, etc.) may be manually added (i.e., via a keyboard, a touch-screen, voice commands, etc.) or account information may be provided through a scanner. Those skilled in the art, having the benefit of this detailed description, will appreciate that for some linked ID values (e.g., credit card numbers), the corresponding account is inherent and STEP 310 may be omitted.

In STEP 320, a polling process continually checks for a trigger. The trigger indicates the time has arrived to determine the foreign paid tax (i.e., aggregate the foreign paid tax). The trigger may be in the form of a telephone call, a text-message, and/or an electronic message. The process shown in FIG. 3 may also be associated with a timeout event that occurs should a trigger not be received. The timeout event may be a lapsed time (i.e., an hour, a day, etc.) without a trigger being received.

Once a trigger has been received or a timeout event has occurred, the process proceeds to STEP 325, where a request for a financial record is issued. STEP 325 is essentially the same as STEP 210, shown and discussed in reference to FIG. 2.

Following STEP 325, the process proceeds to STEP 330. In one or more embodiments of the invention, STEP 330 is essentially the same as STEP 215, shown and discussed in reference to FIG. 2.

Following STEP 330, the process proceeds to STEP 335. In one or more embodiments of the invention, STEP 335 is essentially the same as STEP 220, shown and discussed in reference to FIG. 2.

Following STEP 335, the process proceeds to STEP 340. In one or more embodiments of the invention, STEP 340 is essentially the same as STEP 230, shown and discussed in reference to FIG. 2.

In one or more embodiments of the invention, following calculation of the tax sum (STEP 340), the process stores the calculated tax sum and remains idle until a request for access to the calculated tax sum is received (STEP 345). A request for access (STEP 345) may include any necessary authentication (i.e., passwords, personal identification numbers, biometrics, etc.).

In STEP 350, an additional foreign paid tax may be received. In one or more embodiments of the invention, STEP 350 is essentially the same as STEP 225, shown and discussed in reference to FIG. 2. When STEP 350 is implemented (i.e., there exists additional foreign paid tax), the tax sum may be recalculated to include the additional foreign paid tax (STEP 355). The resulting tax sum may be used to populated form or section of a form (STEP 360). In one or more embodiments of the invention, STEP 360 is essentially the same as STEP 235, shown and discussed in reference to FIG. 2.

Those skilled in the art, having the benefit of this detailed description will appreciate that STEP 310 may be repeated for any number of accounts. Similarly, STEP 325, STEP 330, and STEP 335 may be repeated for any number of financial records.

Figure 4:
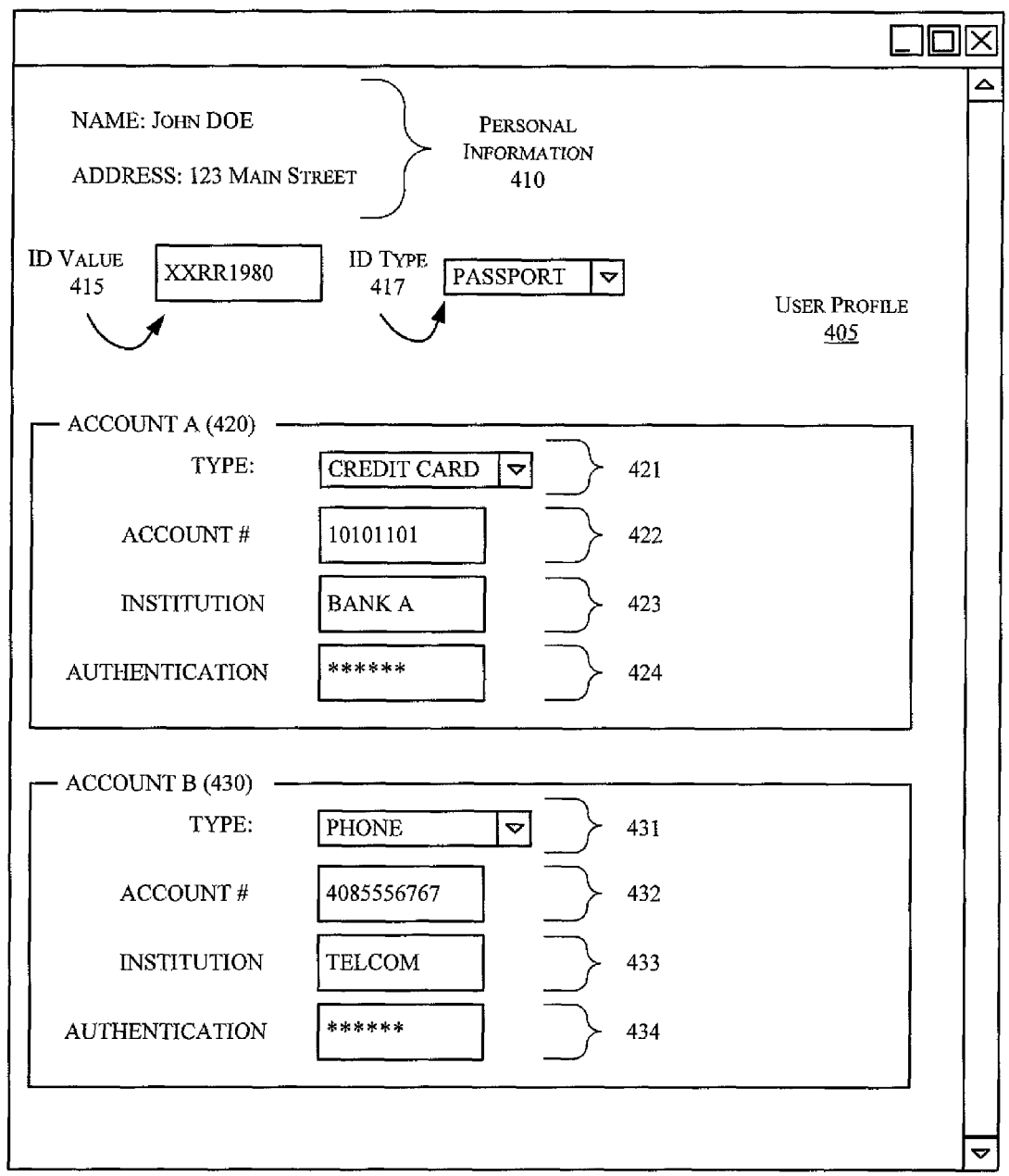
FIG. 4 and FIG. 5 show examples in accordance with one or more embodiments of the invention.

FIG. 4 shows a user profile (405) in accordance with one or more embodiments of the invention. As shown in FIG. 4, the user profile (405) includes personal information (410), an ID value (415), a type of ID value (417), and multiple accounts (i.e., Account A (420) and Account B (430)). Each of the accounts (i.e., Account A (420) and Account B (430)) are associated with account information including account type (421, 431), account number (422, 432), managing financial institution information (423, 433), and authentication information (424, 434).

Figure 5:
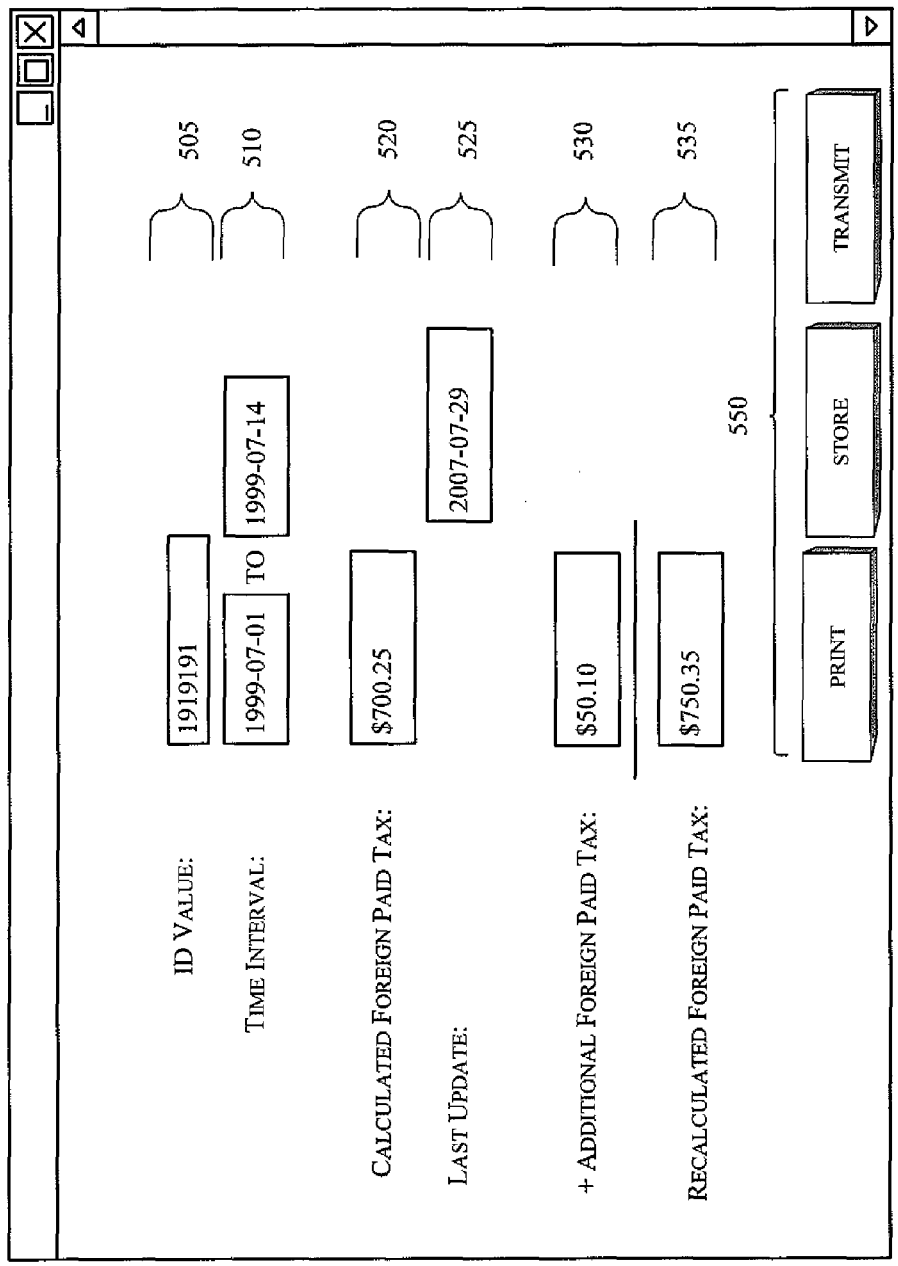

FIG. 5 shows an example interface (500) in accordance with one or more embodiments of the invention. As shown in FIG. 5, the interface (500) includes a field to accept an ID value (505), multiple fields to accept a time interval (510), a field for displaying a calculated foreign paid tax (520), and a time stamp indicating the last update to the calculated foreign paid tax (525). The user interface also includes a field to include additional foreign paid tax (530), a field to display a recalculated foreign paid tax (535), and multiple buttons (550) to print, store, or transmit a form or section of a form populated with the recalculated foreign paid tax (535).

Figure 6:
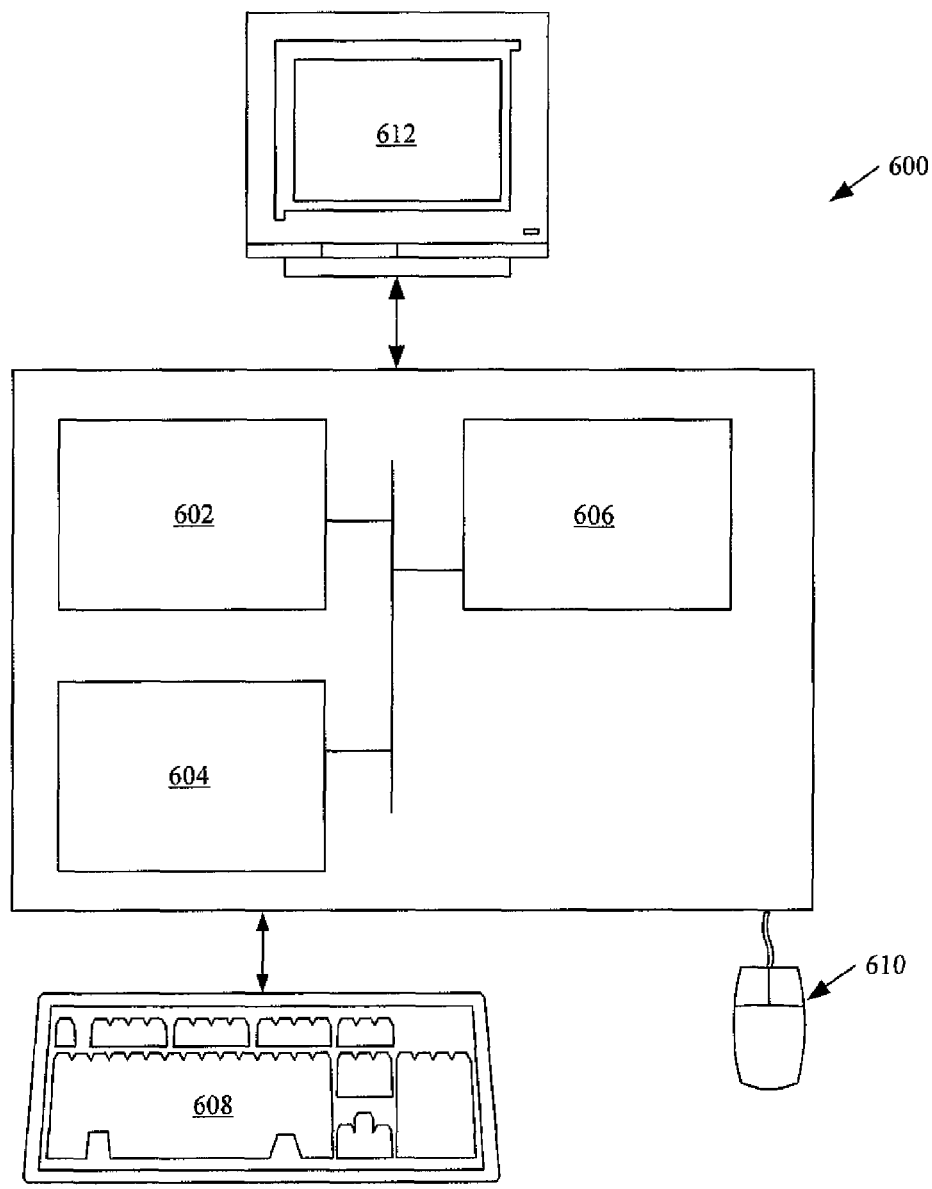
FIG. 6 shows a computer system in accordance with one or more embodiments of the invention.

The invention may be implemented on virtually any type of computer regardless of the platform being used. For example, as shown in FIG. 6, a computer system (600) includes a processor (602), associated memory (604), a storage device (606), and numerous other elements and functionalities typical of today's computers (not shown). The computer (600) may also include input means, such as a keyboard (608) and a mouse (610), and output means, such as a monitor (612). The computer system (600) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (600) may be located at a remote location and connected to the other elements over a network. Further, the invention may be implemented on a distributed system having a plurality of nodes, where each portion of the invention (e.g., the tax module, the form generator, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

Those skilled in the art, having the benefit of this detailed description will appreciate that one or more embodiments of the invention may permit a traveler to populate a visitor tax rebate form upon departure from the foreign country. The user may create a profile at an airport/train station/border crossing kiosk, and revisit a similar kiosk prior to departure to printout and submit to the appropriate authority a populated visitor tax rebate form.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining foreign paid taxes owed by a user, comprising:
   continually polling, using a processor of a computer system, to check for a trigger indicating when the foreign paid taxes need to be determined;
   after receiving the trigger, receiving an identification (ID) value linked to a first account;
   requesting, using the processor, a financial record associated with a foreign tax jurisdiction from the first account using the ID value;
   obtaining a total price of a purchase associated with the financial record;
   extracting a first foreign paid tax from the total price, wherein the first foreign paid tax comprises a value added tax;
   extracting a second foreign paid tax from the total price, wherein the second foreign paid tax is based on a type of the purchase and comprises at least one tax selected from a group consisting of an alcohol tax, a tobacco tax, a gas tax, and a luxury tax;
   calculating, using the processor, a first tax sum based on the first foreign paid tax and a second tax sum based on the second foreign paid tax;
   populating a first section of a form based on the first tax sum;
   populating a second section of the form based on the second tax sum corresponding to the type of the purchase;
   transmitting the form electronically to a tax authority after populating the first section and the second section of the form;
   receiving a confirmation from the tax authority that the form was successfully transmitted; and
   sending an instruction to the tax authority to directly deposit a rebate owed to the user into a second account specified by the user.

2. The method of claim 1, wherein the form is a visitor tax rebate form.

3. The method of claim 1, wherein the ID value is a credit card number and the first account is a credit card account.

4. The method of claim 1, wherein the ID value is a passport number and the first account is at least one selected from a group consisting of a credit card account and a debit card account.

5. The method of claim 1, wherein the ID value is a telephone number and the financial record is stored on at least one selected from a group consisting of a mobile telephone and a personal digital assistant (PDA).

6. The method of claim 1, wherein receiving the ID value comprises accessing a scanner.

7. The method of claim 1, wherein the ID value is linked to the first account through a user profile.

8. The method of claim 1, further comprising:
   determining the foreign tax jurisdiction from the first account prior to requesting the financial record.

9. The method of claim 1, further comprising:
   receiving a time interval, wherein requesting the financial record is further based on the time interval.

10. The method of claim 1, wherein extracting the second foreign paid tax further comprises determining a tax rate associated with the purchase.

11. The method of claim 1, further comprising:
    receiving a manually entered first foreign paid tax, wherein calculating the first tax sum is further based on the manually entered first foreign paid tax.

12. The method of claim 1, further comprising:
    sending the form to a printer after populating the second section of the form.

13. A method for determining foreign paid taxes owed by a user comprising:
    linking an identification (ID) value to a profile of the user;
    linking a first account to the profile;
    continually polling, using a processor of a computer system, to check for a trigger indicating when the foreign paid taxes need to be determined;
    receiving the trigger to initiate aggregation of a first foreign paid tax and a second foreign paid tax recorded in the first account and associated with a foreign tax jurisdiction, wherein the aggregation comprises:
       extracting the first foreign paid tax from a total price of a purchase recorded in the first account; and
       extracting the second foreign paid tax from the total price, wherein the second foreign paid tax is based on a type of the purchase;
       calculating, using the processor, a first tax sum based on the first foreign paid tax; and
       calculating, using the processor, a second tax sum based on the second foreign paid tax,
       wherein the first foreign paid tax comprises a value added tax and the second foreign paid tax comprises at least one tax selected from a group consisting of an alcohol tax, a tobacco tax, a gas tax, and a luxury tax;
    obtaining, using the processor, the first tax sum and the second tax sum from the aggregation;
    populating a first section of a form using the first tax sum;
    populating a second section of the form based on the second tax sum corresponding to the type of the purchase;
    transmitting the form electronically to a tax authority after populating the first section and the second section of the form;
    receiving a confirmation from the tax authority that the form was successfully transmitted; and
    sending an instruction to the tax authority to directly deposit a rebate owed to the user into a second account specified by the user.

14. The method of claim 13, wherein the form is a visitor tax rebate form.

15. The method of claim 13, further comprising:
receiving the ID value to grant access to the first section.

16. The method of claim 15, further comprising:
receiving a manually entered first foreign paid tax after receiving the ID value to grant access, wherein the first tax sum is further calculated from the manually entered first foreign paid tax.

17. The method of claim 13, wherein the ID value is a passport number and the first account is at least one selected from a group consisting of a credit card account and a debit card account.

18. The method of claim 13, wherein the ID value is a name.

19. The method of claim 13, wherein the trigger is received from at least one selected from a group consisting of a telephone and a personal digital assistant (PDA).

20. The method of claim 13, further comprising:
linking a time interval to the profile, wherein the first foreign paid tax is associated with the time interval.

21. A non-transitory computer readable medium storing instructions for determining foreign paid taxes owed by a user, the instructions comprising functionality to:
continually poll to check for a trigger indicating when the foreign paid taxes need to be determined;
after receiving the trigger, receive an identification (ID) value linked to a first account;
request a financial record associated with a foreign tax jurisdiction from the first account; obtain a total price of a purchase associated with the financial record; extract a first foreign paid tax from the total price, wherein the first foreign paid tax comprises a value added tax;
extract a second foreign paid tax from the total price, wherein the second foreign paid tax is based on a type of the purchase and comprises at least one tax selected from a group consisting of an alcohol tax, a tobacco tax, a gas tax, and a luxury tax;
calculate a first tax sum based on the first foreign paid tax and a second tax sum based on the second foreign paid tax;
populate a first section of a form based on the first tax sum;
populate a second section of the form based on the second tax sum corresponding to the type of the purchase;
transmit the form electronically to a tax authority after populating the first section and the second section of the form;
receive a confirmation from the tax authority that the form was successfully transmitted;
and send an instruction to the tax authority to directly deposit a rebate owed to the user into a second account specified by the user.

22. The non-transitory computer readable medium of claim 21, wherein the ID value is a passport number and the first account is at least one selected from a group consisting of a credit card account and a debit card account.

23. The non-transitory computer readable medium of claim 21, wherein the form is a visitor tax rebate form.

24. A non-transitory computer readable medium storing instructions for determining foreign paid taxes owed by a user, the instructions comprising functionality to:
link an identification (ID) value to a profile; link a first account to the profile; continually poll to check for a trigger indicating when the foreign paid taxes need to be determined;
receive the trigger to initiate aggregation of a first foreign paid tax and a second foreign paid tax recorded in the first account and associated with a foreign tax jurisdiction, wherein the aggregation comprises:
extracting the first foreign paid tax from a total price of a purchase recorded in the first account; and
extracting the second foreign paid tax from the total price, wherein the second foreign paid tax is based on a type of the purchase;
calculating a first tax sum based on the first foreign paid tax; and calculating a second tax sum based on the second foreign paid tax,
wherein the first foreign paid tax comprises a value added tax and the second foreign paid tax comprises at least one tax selected from a group consisting of an alcohol tax, a tobacco tax, a gas tax, and a luxury tax; obtain the first tax sum and the second tax sum from the aggregation; populate a first section of a form using the first tax sum; and
populate a second section of the form using the second tax sum corresponding to the type of the purchase;
transmit the form electronically to a tax authority after populating the first section and the second section of the form;
receive a confirmation from the tax authority that the form was successfully transmitted;
and send an instruction to the tax authority to directly deposit a rebate owed to the user into a second account specified by the user.

25. The non-transitory computer readable medium of claim 24, wherein the form is a visitor tax rebate form.

26. The non-transitory computer readable medium of claim 24, wherein the ID value is a passport number and the first account is at least one selected from a group consisting of a credit card account and a debit card account.

27. A system for determining foreign paid taxes owed by a user, the system comprising:
a database storing information on a storage device; and
a processor executing:
an account access module adapted to:
continually poll to check for a trigger indicating when the foreign paid taxes need to be determined;
after receiving the trigger, request a financial record associated with a foreign tax jurisdiction from a first account, wherein the first account is identified based on an identification (ID) value;
receive the financial record; and
send an instruction to a tax authority to directly deposit a rebate owed to the user into a second account specified by the user;
a tax module operatively connected to the account access module and adapted to:
obtain a total price of a purchase associated with the financial record;
extract a first foreign paid tax and a second foreign paid tax from the total price, wherein the first foreign paid tax comprises a value added tax and wherein the second foreign paid tax comprises at least one tax selected from a group consisting of an alcohol tax, a tobacco tax, a gas tax, and a luxury tax; and
calculate a first tax sum based on the first foreign paid tax and a second tax sum based on the second foreign paid tax; and
a form generator operatively connected to the tax module and adapted to:
populate a first section of a form using the first tax sum;

populate a second section of the form using the second tax sum;

transmit the form electronically to the tax authority after populating the first section and the second section of the form; and receive a confirmation from the tax authority that the form was successfully transmitted.

28. The system of claim 27, the storage device comprising: a user profile repository storing a user profile linking the first account and the ID value.

29. The system of claim 28, wherein the user profile repository is accessible by phone.

30. The system of claim 27, wherein the ID value is a passport number and the first account is at least one selected from a group consisting of a credit card account and a debit card account.

31. The system of claim 27, wherein the form is a visitor tax rebate form.

32. The system of claim 27, the processor further executing:

a printer operatively connected to the form generator and configured to print the form.

33. The system of claim 27, the processor further executing:

a user terminal comprising a user interface and operatively connected to the account access module, the tax module, and the form generator.

* * * * *